United States Patent

[11] 3,631,910

| [72] | Inventors | Henry Richard Crowther<br>Crystal Lake;<br>Thomas P. Hurst, Wayne, both of Ill. |
|------|-----------|-------------------------------------------------------------------------------|
| [21] | Appl. No. | 879,146 |
| [22] | Filed     | Nov. 24, 1969 |
| [45] | Patented  | Jan. 4, 1972 |
| [73] | Assignee  | Maruyama Mfg. Co. Ltd.<br>Tokyo, Japan |

[54] SPRING WASHER
8 Claims, 8 Drawing Figs.

[52] U.S. Cl. .................................................. 151/38
[51] Int. Cl. .................................................. F16b 39/24
[50] Field of Search .......................................... 151/38, 35, 37

[56] References Cited
UNITED STATES PATENTS

| 770,987   | 9/1904 | Spiegel et al. ................ | 151/38 |
| 1,963,535 | 6/1934 | Trotter ........................ | 151/38 |

FOREIGN PATENTS

| 779,361 | 4/1935 | France ....................... | 151/38 |
| 790,781 | 2/1958 | Great Britain ............... | 151/38 |

Primary Examiner—Edward C. Allen
Attorneys—Olson, Trexler, Wolters & Bushnell, Robert W. Beart, Michael Kovac, Barry L. Clark and Jack R. Halvorsen ABSTRACT: The present invention relates generally to washer devices for operative association with the clamping side of rotary threaded fasteners such as screwheads and nuts, and more particularly to washers of the type which are adapted to yield axially when clamped in position against a work surface. The present application discloses a pair of spring-type annular, conical juxtapositioned washer bodies. Sections of the washer bodies intermediate the inner and outer margins thereof are deflected so as to provide increased lateral strength and abutting surfaces of limited area. The outer margin of one body is provided with flange means for interlocking with the other washer member so as to maintain said members in proper juxtaposition.

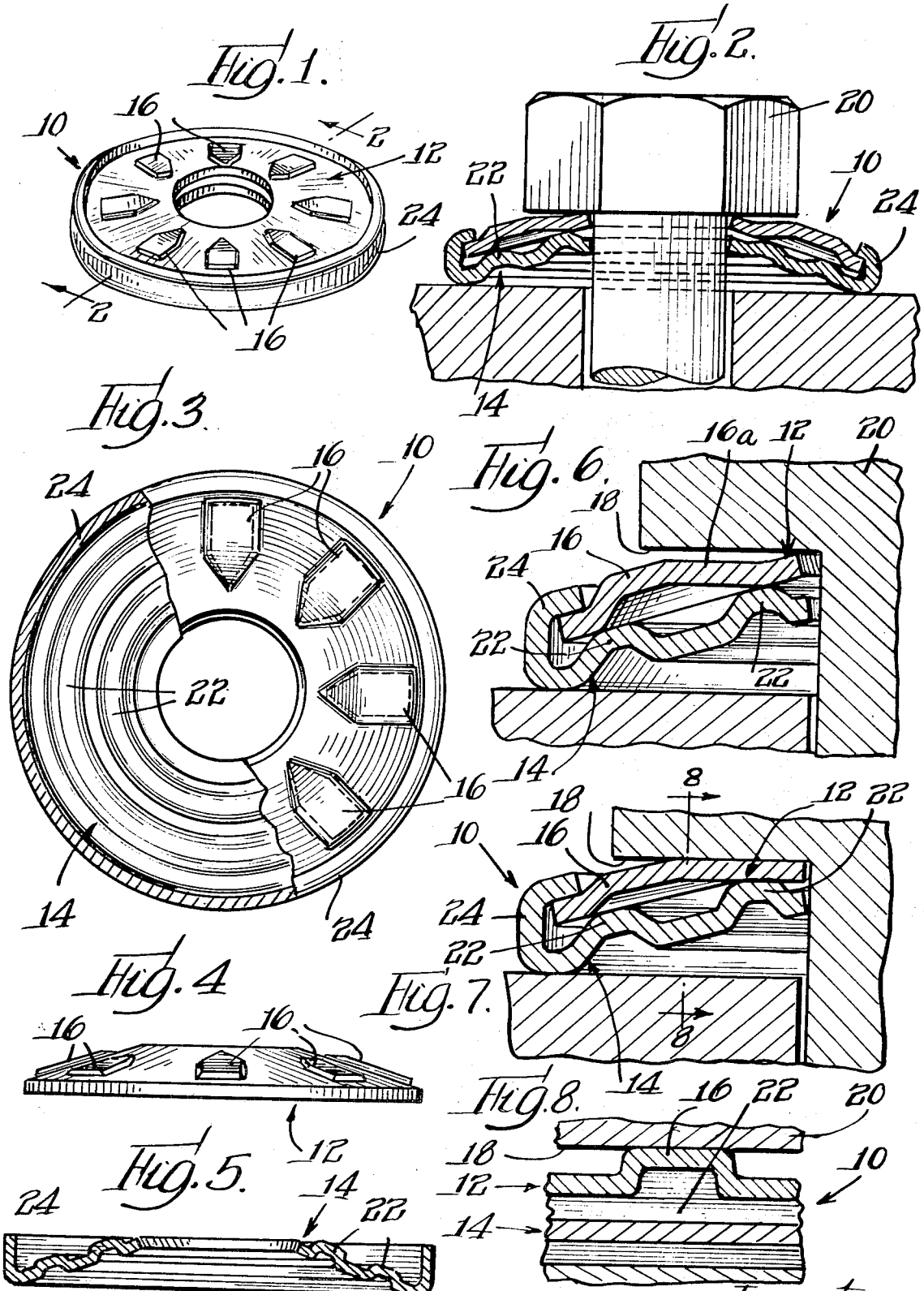

SPRING WASHER

It is one of the objects of the present invention to provide an improved novel spring-type washer device which makes possible the use of relatively thin washer stock without sacrificing the locking effectiveness of the washer.

More specifically, the present invention contemplates the provision of a spring-type washer of the type referred to above which may be made of two annular light-gauge washer elements disposed in superimposing relation.

The present invention also contemplates the provision of an improved, inexpensive locking washer of the axially yieldable type and to this end a washer device of the conical or Belleville shape is contemplated.

The foregoing and other objects and advantages will be more apparent from the following detailed description when considered in connection with the accompanying drawing, wherein:

FIG. 1 is a perspective view of one embodiment of a spring-type washer device contemplated by the present invention;

FIG. 2 is a central transverse sectional view of the lockwasher shown in FIG. 1, disclosed in association with the clamping side of a screw or bolthead;

FIG. 3 is an enlarged plan view of the washer device shown in FIG. 1, a portion of the outer or upper washer being broken away more clearly to show the structure details of the washer member positioned therebeneath;

FIG. 4 is a side elevational view of the upper or outer washer member;

FIG. 5 is a central transverse-sectional view of the lower or inner washer member prior to the assembly therewith of the washer member shown in FIG. 4;

FIG. 6 is a fragmentary, enlarged sectional view of the left portion of the combined screw and washer shown in FIG. 2, prior to clamping the screwhead against the washer device;

FIG. 7 is a fragmentary sectional view similar to FIG. 6 showing the washer device in final clamped position beneath the bolthead; and, FIG. 8 is an enlarged fragmentary vertical sectional view taken substantially along the line 8—8 of FIG. 7, more clearly to illustrate the structural nature of the protuberances associated with the washer elements or bodies.

DESCRIPTION

Referring not to the drawing more in detail wherein like numerals have been employed to designate similar parts throughout the various figures, it will be seen that one embodiment of the present invention comprises an annular washer device designated generally by the numeral 10. The washer device 10 includes an annular, substantially conical washer body or member 12, disposed in adjacent superimposed relation with respect to a second annular, substantially conical washer body or member 14. Annularly spaced sections of the washer body 12 are axially deflected in a direction away from the washer body 14 so as to provide a plurality of annularly spaced and substantially radially disposed body-stiffening protuberances 16. It will be noted that these protuberances 16 are positioned intermediate and spaced from the inner and outer margins of the washer body 12. In this manner, considerable lateral strength is imparted to the relatively light-gauge washer stock. Attention is directed to the fact that the inner extremities of these radial protuberances 16 gradually merge into the inner margin of the washer body 12. By reason of this construction the radially inward portion of each of the protuberances 16 provide a surface 16a which is adapted to receive the clamping surface 18 of a bolthead 20 when the parts are finally clamped in position as shown in FIG. 7.

The inner or lower washer body 14 is formed with a pair of concentric annular protuberances or ribs 22. A peripheral flange 24 of the annular washer member 14 superimposes the adjacent outer peripheral margin of the washer member 12 so as to maintain the washer member 12 in proper adjacently superimposed position with respect to the washer member 14. With the washer members so positioned the annular protuberances 22 are maintained in engagement with the under surface portions of the washer member 12 extending between the protuberances 16.

It will be apparent that the protuberances 16 and 22 lend considerable lateral strength to the relatively thin metallic stock of each washer. The combined washer bodies 12 and 14 present a unitary conical or frustoconical structure which will yieldably resist forces tending to flatten the washers. It is preferable to form the central aperture of the washer 12 slightly larger than the central aperture of the washer 22. Thus any misalignment of the two washer apertures will not interfere with the telescopic association therewith of a screw shank.

From the foregoing it will be understood that the present invention contemplates a spring-type washer of improved functional characteristics and a washer which may be produced at minimum cost. By employing two washer members of relatively thin stock as distinguished from a single washer member of conventionally heavier material, economy in cost of manufacture is assured. The areas of limited contact between the two washers, resulting from the use of the above-mentioned protuberances 16 and 22 contributes materially to the satisfactory functioning of the device. It will be seen from FIGS. 6 and 7 that when the washer is tightened from the position shown in FIG. 6 to the final position shown in FIG. 7 the inner margin of the washer 12 will be flattened to complete contact with the clamping surface 18 of the threaded fastener. When this portion of the washer body 12 is engaged by the clamping surface 18 as shown in FIG. 7, the inner annular protuberance 22 yieldably resists further flattening of the combined washer members.

What is claimed is:

1. A preassembled spring-type washer device for operative association with the clamping side of rotary-threaded fasteners such as screwheads and nuts, including a first centrally apertured annular conical spring washer body, a second centrally apertured annular conical spring washer body adjacently superimposed by said first washer body, radially spaced protuberant means integral with and projecting axially from said first washer body in a direction away from said second washer body, concentric annularly spaced protuberant means integral with and projecting axially from said second annular body toward said first washer body into engagement with the surface areas positioned between the protuberant means associated with said first washer body and circumferentially disposed means interlocking the outer peripheral margins of said annular conical washer bodies against relative axial separation so as to maintain them in juxtaposition.

2. A spring-type washer device as set forth in claim 1, wherein said protuberant means comprise axially offset sections of each washer body.

3. A spring-type washer device as set forth in claim 1, wherein the washer bodies are formed of relatively light-gauge sheet metal stock.

4. A spring-type washer device as set forth in claim 1, wherein the protuberant means are positioned intermediate and spaced from the inner and outer margins of their respective washer body.

5. A spring-type washer device as set forth in claim 1, wherein the protuberant means of said second washer body has limited area of contact with the adjacent surface of said first washer body.

6. A spring-type washer device as set forth in claim 1, wherein outer peripheral flange means of one washer body overlaps the adjacent outer margin of the other washer body to secure said bodies together as a unit.

7. A spring-type washer device as set forth in claim 1, wherein the protuberant means of the first washer body gradually merge with the inner margin of said body.

8. A spring-type washer device as set forth in claim 1, wherein the washer aperture of the first body is slightly larger than the diameter of the aperture of the second washer body.

UNITED STATES PATENT OFFICE
CERTIFICATE OF CORRECTION

Patent No. 3,631,910      Dated January 4, 1972

Inventor(s) Henry Richard Crowther and Thomas P. Hurst

It is certified that error appears in the above-identified patent and that said Letters Patent are hereby corrected as shown below:

In the heading on the cover sheet, lines 3, 4 and 5 should be cancelled and the following substituted therefor:

Henry Richard Crowther, Crystal Lake, and Thomas P. Hurst, Wayne, both of Illinois, assignors to Illinois Tool Works, Inc., Chicago, Ill., a corp. of Del.

Signed and sealed this 18th day of April 1972.

(SEAL)
Attest:

EDWARD M.FLETCHER, JR.      ROBERT GOTTSCHALK
Attesting Officer      Commissioner of Patents